Sept. 8, 1936.  J. JACOBSON  2,053,336

AIR DUCT

Filed April 22, 1935

INVENTOR.
JACOB JACOBSON
BY
ATTORNEY.

Patented Sept. 8, 1936

2,053,336

UNITED STATES PATENT OFFICE 2,053,336

AIR DUCT

Jacob Jacobson, Cincinnati, Ohio

Application April 22, 1935, Serial No. 17,654

7 Claims. (Cl. 285—197)

The invention relates to air ducts particularly, but not exclusively, adapted for use in buildings for conveying cold air, warm air, or reconditioned air.

The objects of the invention are to provide simple, efficient and practical means adapted to convey currents of air from one location to another; to provide simple and efficient means for connecting the tubes of the air ducts so that the outer surface of said air duct presents a plane surface which may fit uniformly in the corner of a wall and ceiling, of a building, or be arranged in other suitable locations; to provide means inside said abutting ends of said tubes, of said duct, adapted to seal said tubes to prevent escape of air from between said abutting ends, and adapted to reduce the resistance to the flow of air to a minimum; and to provide simple and efficient means to maintain said tubes in alignment.

Other objects of the invention will be apparent by reference to the hereinafter description, claims and drawing.

The invention consists in the combination of the elements, arrangement of the parts and in the details of the construction, as hereinafter claimed.

Figure 1:
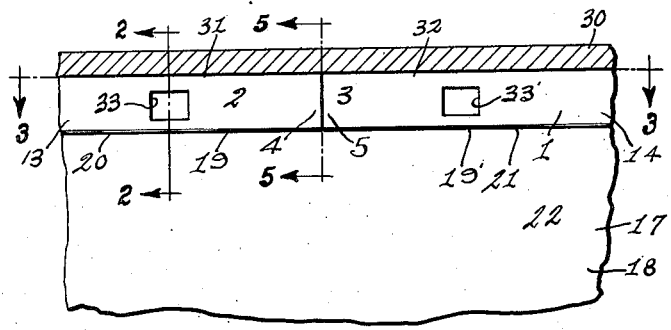
Fig. 1 is a vertical section of a ceiling showing a side elevational view of the wall, with the invention incorporated therewith.
Figure 2:
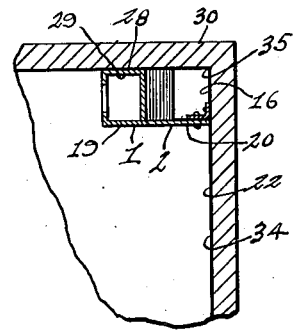
Fig. 2 is a section taken on a line corresponding to 2—2 in Fig. 1.
Figure 3:
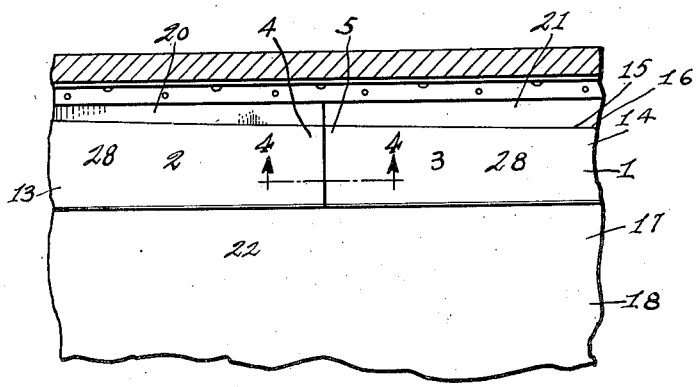
Fig. 3 is a section taken on a line corresponding to 3—3 in Fig. 1.
Figure 4:
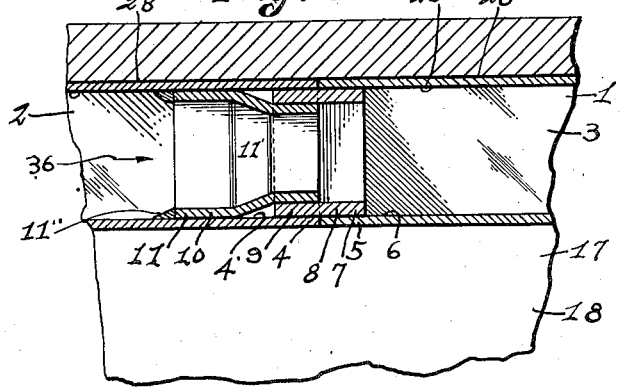
Fig. 4 is a section taken on a line corresponding to 4—4 in Fig. 3.
Figure 5:
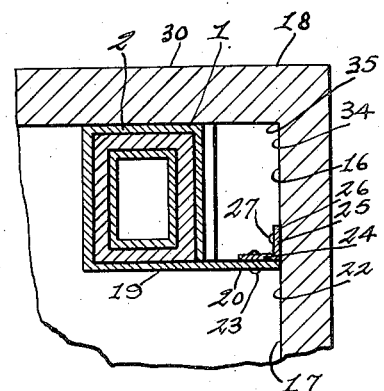

Fig: 5 is a section taken on a line corresponding to 5—5 in Fig. 1.

In the preferred construction of the invention I provide the horizontal air duct 1 which comprises a plurality of rectangular horizontal tubes 2 and 3 having their ends 4 and 5 abutting and in contact with each other. The tubes 2 and 3 are in longitudinal alignment with each other and their outer sides are smooth without obstructions, and in horizontal alignment because of the hereinafter described joint structure. The tubes 2 and 3 are formed from metal of equal thickness and the outer surface of the tube 2 is aligned with the outer surface of the tube 3.

Fixed to the inner surface 6 of the end 5, of the tube 3, is the end 7 of the sleeve or collar 8 whose end 9 extends within the end 4 of the adjacent tube 2. The end 7, of the sleeve 8, is fixed to the inner surface of the tube 3 as by spot welding, or other suitable means.

Fixed to the inner surface 4' of the end 4, of the tube 2, is the end 10 of the collar or sleeve 11.

The sleeves 8 and 11, respectively, are rectangular and the sleeve 8 closely contacts the inner surface of the tubes 2 and 3. The end 10 of the sleeve 11 closely contacts the inner surface of the tube 2 and is fixed to the inner surface of the tube 2 as by spot welding, or other suitable means. The portion 11' of the sleeve 11 intermediate its ends 10 and 12 is inclined inwardly and outwardly to permit the end 12 to be received into and in close contact with the inner surface of the end 7 of the sleeve 8.

The end 12 of the sleeve 11 extends over the edge of the end 9 of the sleeve 8. In order to further seal the sleeve 11, with respect to the tube 2, suitable material, such as solder 11'', is fixed to the inner surface 4' of the tube 2 and to the end 10 of the sleeve 11.

The duct is tapered from the end 13 to the end 14, whereby the space 15 between the side 16 of the duct 1 and wall 17, of the building 18, increases from the end 13 toward the end 14 of the duct.

Integrally formed with the bottoms 19 and 19', of the tubes 2 and 3 are the horizontal aprons 20 and 21 whose inner edges contact the inner surface 22 of the wall 17 and is fixed, as by bolts or rivets 23, to the horizontal leg 24 of the angle bar 25 whose vertical leg 26 is fixed, as by the screws 27, to the inner surface of the wall 17. The tops 28 and 28', of the tubes 2 and 3, have received therethrough the screws 29 which fix the duct 1 to the inner surface of the ceiling 30. In the outer sides 31 and 32, of the tubes 2 and 3 are the outlets 33 and 33' for the purpose of permitting air to escape from within the duct 1 outwardly and into the room 34 of the building 18.

The sleeve 8 is formed from material which is thicker than the material from which the tubes 2 and 3 are formed, whereby the ends 4 and 5, of the tubes 2 and 3, are maintained in longitudinal and horizontal alignment.

An advantage of the invention is that the duct 1 is positioned in the corner 35, of the room 34, and extends horizontally thereby presenting a plane outer surface which is unlikely to collect dirt, dust or the like, since the ends 4 and 5, of the tubes 2 and 3, abut each other and any space between the abutting ends of the tubes may be filled with any suitable plastic material. Moreover, the aprons 20 and 21, which are integrally formed with the horizontal bottoms 19 and 19' of the tubes, provides a plane uninterrupted surface or bottom of the duct 1 and which extends horizontally, whereby the duct requires no more space than an ordinary and usual beam and, in fact, appears as a beam.

Another advantage of the invention is that the sleeve 11, being tapered from its end 10 to the end 12, permits the flow of air in the direction indicated by the arrow 36 with minimum resistance of the sleeves and tubes. Also, the end 10, of the sleeve 11, is sealed in contact with the inner surface of the tube 2 to prevent escape of air between the sleeve 11 and the tube 2.

It is, therefore, quite apparent that I have invented a highly practical and serviceable device for the intended purpose which may be utilized advantageously.

I have illustrated the preferred construction of the invention, and believe the form of the invention as shown and described to be efficient and practical for the intended purposes. I realize, however, that various changes and modifications, not only in the forms of the invention but, also, with respect to the materials, and their sizes may be modified and varied. Therefore, I desire to state that it is intended that various changes may be made, without departing from the spirit and scope of the invention, and the air duct may extend horizontally, vertically or in other directions, as defined in the claims.

What I claim as new and desire to secure by Letters Patent is:

1. A duct comprising a plurality of horizontal and rectangular tubes having their ends abutting each other and in longitudinal alignment with each other and with their outer surfaces in horizontal alignment, a collar fixed to the inner surface of one of said tubes and adjacent the end thereof, said collar extending into the abutting end of the adjacent tube, and a collar fixed to the inner surface of said adjacent tube adjacent the end thereof, and said last mentioned collar extending over an edge of said first mentioned collar.

2. A duct comprising a plurality of tubes having their ends abutting each other and with their outer surfaces in horizontal alignment, a collar fixed to one of said tubes and adjacent the end thereof, said collar extending into the abutting end of the adjacent tube, and a collar fixed to said adjacent tube adjacent the end thereof, and said last mentioned collar extending over an edge of said first mentioned collar.

3. A duct comprising a plurality of tubes having their ends abutting each other, a collar fixed to one of said tubes, said collar extending into the abutting end of the adjacent tube, and a collar fixed to said adjacent tube adjacent the end thereof, and said last mentioned collar extending over said first mentioned collar.

4. An air duct comprising a plurality of tubes having ends abutting each other and with their outer surfaces in horizontal alignment, the outer surface of said duct being smooth, a collar fixed to the inner surface of one of said tubes and adjacent the end thereof, said collar extending into the abutting end of the adjacent tube, and a collar having an end fixed to the inner surface of said adjacent tube adjacent the end thereof, and extending over an edge of said first mentioned collar, the fixed end of said second mentioned collar being headed against the flow of air through said duct, said collars being formed from material having greater thickness than the material from which said tubes are formed.

5. An air duct comprising a plurality of tubes having a collar fixed to the inner surface of one of said tubes and adjacent the end thereof, said collar extending into the abuting end of the adjacent tube, and a collar having an end fixed to the inner surface of said adjacent tube, and extending over an edge of said first mentioned collar, the fixed end of said second mentioned collar being headed against the flow of air through said duct, said collars being formed from material having greater thickness than the material from which said tubes are formed.

6. An air duct comprising a plurality of tubes having ends abutting each other and with their outer surfaces in horizontal alignment, the outer surface of said duct being smooth, a collar fixed to the inner surfaces of one of said tubes and adjacent the end thereof, said collar extending into the abutting end of the adjacent tube, and a collar having an end fixed to the inner surface of said adjacent tube adjacent the end thereof, and extending over an edge of said first mentioned collar, the fixed end of said second mentioned collar being headed against the flow of air through said duct.

7. An air duct comprising a plurality of tubes having a collar fixed to the inner surface of one of said tubes and adjacent the end thereof, said collar extending into the abutting end of the adjacent tube, and a collar having an end fixed to the inner surface of said adjacent tube, and extending over an edge of said first mentioned collar, the fixed end of said second mentioned collar being headed against the flow of air through said duct.

JACOB JACOBSON.